United States Patent
Mardmoeller et al.

(10) Patent No.: US 11,876,879 B2
(45) Date of Patent: Jan. 16, 2024

(54) MESSAGE HANDLER

(71) Applicant: RENESAS ELECTRONICS CORPORATION, Tokyo (JP)

(72) Inventors: Christian Mardmoeller, Duesseldorf (DE); Dnyaneshwar Kulkarni, Duesseldorf (DE); Thorsten Hoffleit, Duesseldorf (DE)

(73) Assignee: RENESAS ELECTRONICS CORPORATION, Tokyo (JP)

(*) Notice: Subject to any disclaimer, the term of this patent is extended or adjusted under 35 U.S.C. 154(b) by 44 days.

(21) Appl. No.: 17/242,609

(22) Filed: Apr. 28, 2021

(65) Prior Publication Data

US 2021/0250428 A1 Aug. 12, 2021

Related U.S. Application Data

(63) Continuation of application No. 15/999,728, filed as application No. PCT/EP2016/053459 on Feb. 18, 2016, now Pat. No. 11,019,182.

(51) Int. Cl.
*H04L 29/06* (2006.01)
*H04L 69/08* (2022.01)
(Continued)

(52) U.S. Cl.
CPC ............ *H04L 69/08* (2013.01); *H04L 12/66* (2013.01); *H04L 45/741* (2013.01); *H04L 69/18* (2013.01); *H04L 45/306* (2013.01); *H04L 69/325* (2013.01)

(58) Field of Classification Search
CPC ....... H04L 69/08; H04L 69/18; H04L 69/325; H04L 12/66; H04L 45/741; H04L 45/306
See application file for complete search history.

(56) References Cited

U.S. PATENT DOCUMENTS 6,324,178 B1 11/2001 Lo et al.
2006/0168267 A1 7/2006 Fernandes et al.
(Continued)

FOREIGN PATENT DOCUMENTS

CN 101232495 A 7/2008
CN 102255958 A 11/2011
(Continued)

OTHER PUBLICATIONS

Jin Ho Kim et al., 'Gateway Framework for In-Vehicle Networks Based on CAN, Flexray, and Ethernet', IEEE Transaction on Vehicular Technology, vol. 64, No. 10, Oct. 2015, pp. 4472-4486. (Year: 2015).*

(Continued)

*Primary Examiner* — Melvin C Marcelo
(74) *Attorney, Agent, or Firm* — BURR & FORMAN LLP

(57) ABSTRACT

A message handler is described. The message handler is configured, in response to receiving a data package which is formatted according to a given communications protocol, such as CAN or Ethernet, and which comprises package-directing data and payload data, to generate package having a predetermined data format, for example a layer-2 or layer-3 package, which comprises a header and payload data. The header comprises an address generated in dependence upon the package-directing data and wherein the payload comprises the data package. The package having a predetermined data format may be an IEEE 1722 frame.

19 Claims, 9 Drawing Sheets

(51) Int. Cl.
  *H04L 69/18* (2022.01)
  *H04L 45/741* (2022.01)
  *H04L 12/66* (2006.01)
  H04L 69/325 (2022.01)
  H04L 45/302 (2022.01)

(56) References Cited

U.S. PATENT DOCUMENTS

| | | |
|---|---|---|
| 2007/0014278 A1 | 1/2007 | Ebbesen et al. |
| 2007/0014303 A1 | 1/2007 | Schulz |
| 2010/0027416 A1 | 2/2010 | Beauford |
| 2011/0149982 A1 | 6/2011 | Hwang et al. |
| 2012/0099589 A1 | 4/2012 | Kato |
| 2012/0291127 A1 | 11/2012 | Rangarajan et al. |
| 2014/0133350 A1 | 5/2014 | Triess et al. |

FOREIGN PATENT DOCUMENTS

| | | |
|---|---|---|
| CN | 104516765 A | 4/2015 |
| CN | 105103460 A | 11/2015 |
| DE | 102012215765 A1 | 5/2014 |
| EP | 2833585 A1 | 2/2015 |
| EP | 2938046 A1 | 10/2015 |
| JP | 2009027245 A | 2/2009 |
| WO | 02059757 A1 | 8/2002 |
| WO | 02062089 A1 | 8/2002 |
| WO | 2011135457 A2 | 11/2011 |
| WO | 2015080658 A1 | 6/2015 |

OTHER PUBLICATIONS

S. Zhiqiang: "Simplify CAN and LIN In-vehicle Network Testing", World Electronic Components (2006).

* cited by examiner

| Address | Bit | Comment |
|---|---|---|
| +0 | 802.1 header | Under SW control based on AFL |
| - | Optional 802.1Q header | Under SW control based on AFL |
| +14 | subtype[28:11] | Under SW control based on AFL |
| | sv | Under SW control based on AFL |
| | version[2:0] | Under SW control based on AFL |
| | r | 0 |
| | ntscf_data_length[10:0] | Calculated based on DLC |
| | sequence_num[7:0] | Cyclically updated |
| +18 | stream_id[63:0] | Under SW control based on AFL |
| +22 | acf_msg_type[6:0] | Under SW control based on AFL |
| | acf_msg_length[8:0] | Calculated based on DLC |
| | pad[1:0] | Calculated based on DLC |
| | mtv | Under SW control based on AFL |
| | rtr | RTR |
| | eff | IDE |
| | hdr | 0 (CAN-FD only) |
| | edl | 0 (CAN-FD only) |
| | esi | 0 (CAN-FD only) |
| | rsv[2:0] | Under SW control based on AFL |
| | can_bus_id | Under SW control based on AFL |
| | rsv[2:0] | Under SW control based on AFL |
| +26 | message_timestamp[63:0] | Receive time for SW |
| +34 | can_identifier[28:0] | ID (standard or extended) |
| +38 | DATA[31:0] | |
| +42 | DATA[63:32] | |

▓ = Copied from media-dependent package

▨ = Selected based on received CAN message

▩ = Calculated

Fig. 7

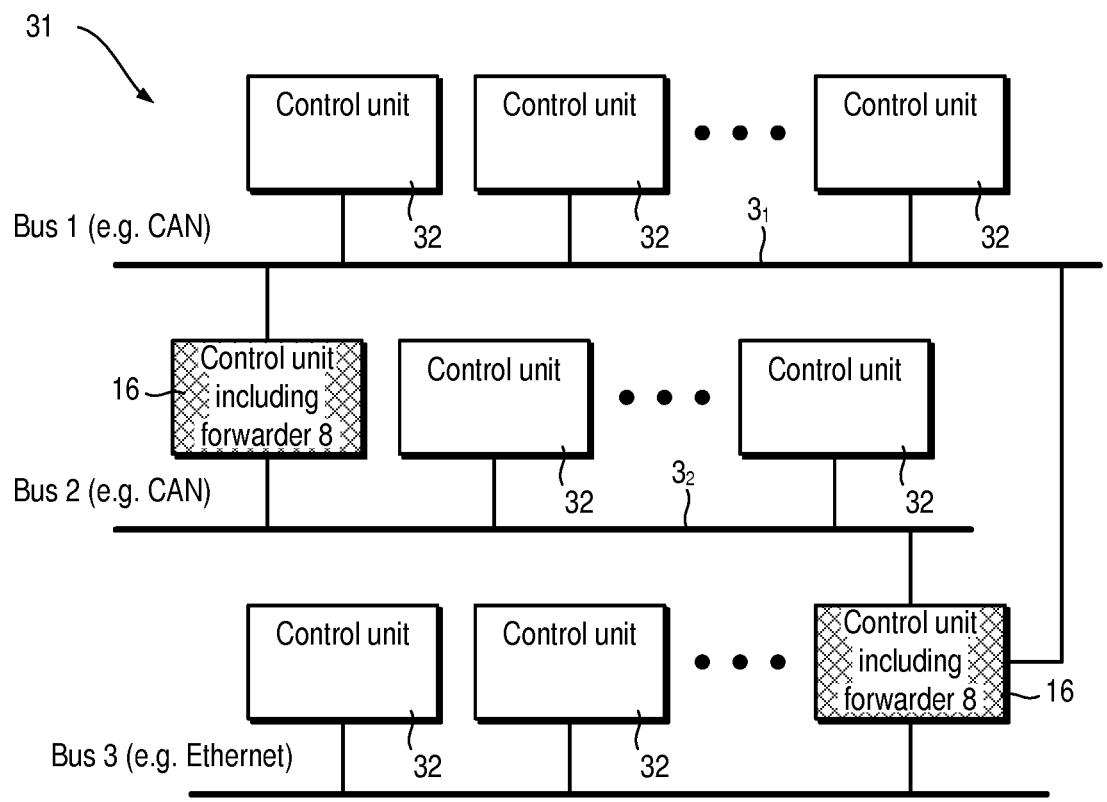
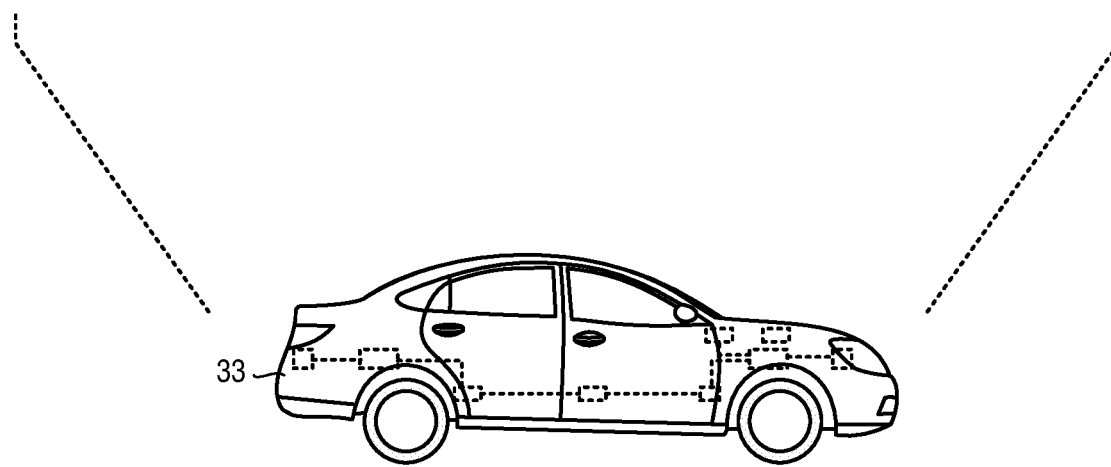
Fig. 8

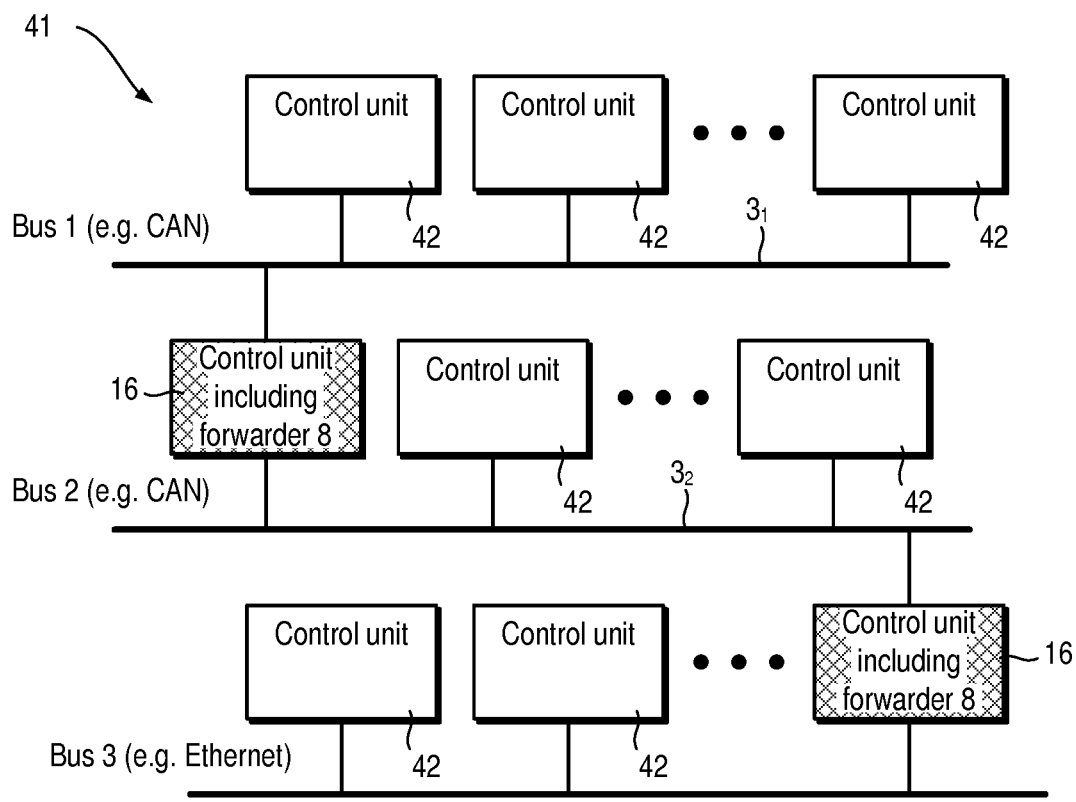
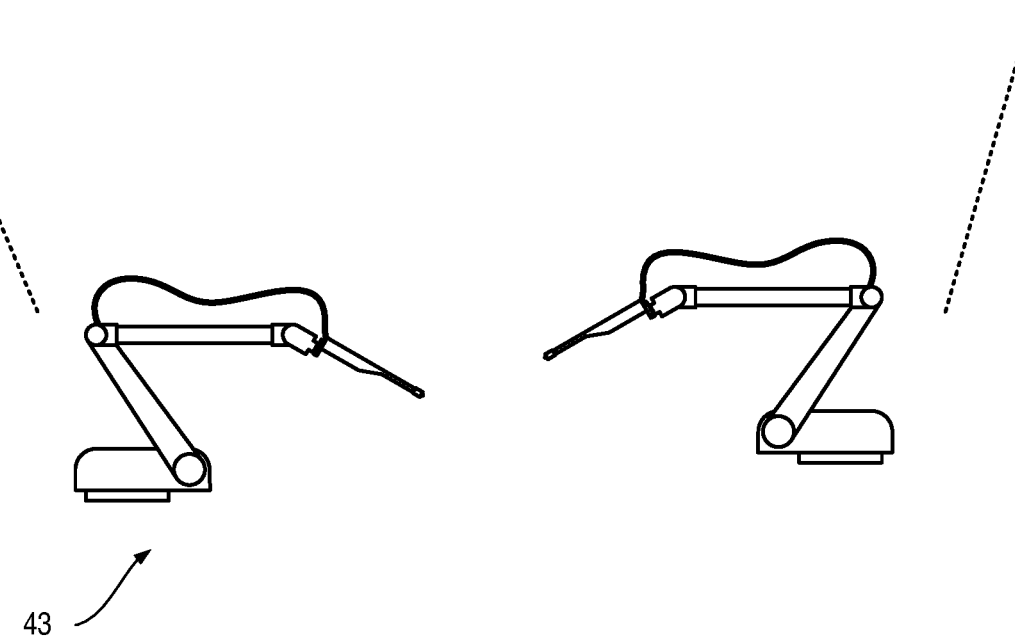
Fig. 9

MESSAGE HANDLER

FIELD OF THE INVENTION

The present invention relates to a message handler and to a control unit comprising at least two message handlers and message forwarder configured to switch or route data packages between message handlers.

BACKGROUND

A gateway allows information exchange between different network interfaces. The network interfaces can use the same or different OSI physical layer ("layer 1"), data link ("layer 2") and/or network layer ("layer 3") protocol(s), such as Ethernet, controller area network (CAN), FlexRay and media orientated systems transport (MOST). Examples of gateways include Ethernet switches, Digital Subscriber Line Access Multiplexers (DSLAMs) and fieldbus gateways.

Layer 2 gateways within the same protocol, such as Ethernet 10/100/1000 switches and CAN/CAN gateways, tend to be simple because frames in the data link layer are identical, although data rates can change. Layer 2 gateways across protocols, such as CAN/CAN-FD gateways, can provide re-framing without changing a packet (or "package") on the network layer. Layer 3 gateways, such as IPv4/IPv6 gateways or CAN/Ethernet gateways, can re-structure a packet for the different addressing and traffic control requirements. Layer 4 to 7 gateways, such as TCP/UDP gateways and AUTOSAR signal gateways, allow changes between different transport protocols and re-assembling of information.

Layer 2 gateways within the same protocol or protocol family tend to be implemented in hardware and examples of such gateways include the CAN/CAN gateway in Renesas RH850/C1M microcontroller and the CAN/CAN-FD gateway in Renesas RH850/D1M microcontroller.

Referring to FIG. 1, layer 3 gateways are often implemented in software. A microcontroller has a set of network interfaces and software executed by a central processing unit of the microcontroller that can re-assemble a packet based on a configuration matrix. Examples of such gateways include a USB/UART converter and an automotive CAN/LIN/FlexRay gateway. Because communication protocols have different addressing schemes and have different message structures, software provides flexibility to convert between different protocols.

Layer 4 to 7 gateways are generally implemented in software. Re-assembling data in higher layers tends to require significant configurability and flexibility and this can only be practically achieved using a software-based implementation, although hardware-based solutions are possible, for example, in time-critical, conversion-specific cases, such as video data.

Framing of network layer packages is usually carried out in hardware and is transparent for the routing mechanism. Examples in which packet framing occurs include an Ethernet MAC, a FlexRay communication controller and a CAN protocol engine. All protocols tend to have an individual, optimised interface to exchange information with a higher layer.

Layer 3 gateways within same protocol family also tend to be easy to implement in hardware. Only minimal changes in packet structure are required in situations involving, for example, CAN/CAN-FD conversion and IPv4/IPv6 conversion.

Layer 3 gateways involving different protocols tend to be difficult to implement in hardware because of a need to reformat a packet so as to accommodate different addressing, routing and traffic control schemes. Packet conversion generally requires a flexible, configurable data manipulation unit. This can result in a gap in information because not all frame information may be convertible, such as in the case of Ethernet length to CAN DLC.

Addressing scheme conversion needs configurable translation tables between both network layers. Traffic control scheme conversion typically needs either a new layer 4 transport protocol or other high-level support.

Increasingly, communication systems comprise more than one type of bus system which are interconnected. This makes forwarding of data more complex.

US 2014/0133350 A1 describes a gateway module for connecting at least two sub-networks including first and second sub-networks supporting data transmission in accordance with a first and second communications protocols respectively. The gateway module has a configurable hardware circuit which is adapted to manipulate and forward data from the first sub-network and to the second sub-network taking into consideration the first and second communications protocols. However, as the number and type of communication protocols increases, this type of gateway becomes increasingly complex or requires hardware modification. Thus, as new communication interfaces are introduced, not only must a new interface module be added, but also the gateway module may need modification.

SUMMARY

According to a first aspect of the present invention there is provided a message handler. The message handler is configured, in response to receiving a data package which is formatted according to a given communications protocol and which comprises package-directing data and payload data, to generate a package having a predetermined data format, for example a layer-2 or layer-3 package, which comprises a header and payload data. The header comprises an address generated in dependence upon the package-directing data and the payload comprises the package.

Thus, different message handlers for different communications protocols can be provided in a control unit and be used to generate packages having a common data format. This can help to facilitate exchange of data between two or more communications buses and a host processor, and to enable a hardware-based switch or router to be used for exchanging data between the buses. Thus, the same routing mechanism can be used regardless of the specific communication protocols being used, whether they are the same or different protocols.

The incoming data package may exclude cyclic redundancy check data. The incoming data package may include a timestamp.

The package-directing data may comprise a message identity or a message content identifier (which can be used to identify multicast destinations), or a destination node address. The address may be a stream identifier.

The message handler may be configured to copy data from a first field in the package-directing data into a corresponding field in the header. The message handler may be configured to add predetermined data to a second field in the header. The predetermined data may be supplied by a host processor. The message handler may be configured to add calculated data to the header in dependence upon data from the first field and/or from a second field to a second field in the header.

The message handler may be configured, in response to receiving a package having a predetermined data format which comprises a header and payload data, to extract a data package which is formatted according to a given communications protocol and which comprises package-directing data and payload data.

According to a second aspect of the present invention there is provided a message handler configured, in response to receiving a package having a predetermined data format which comprises a header and payload data, to extract a data package which is formatted according to a given communications protocol and which comprises package-directing data and payload data.

The package having the predetermined data format may be an IEEE 1722 frame. The predetermined data format may comply with IEEE 1722. The package having the predetermined data format may be an AVTP control message. The address may be a stream ID. The package having the predetermined data format may be a layer 2 frame. The package having the predetermined data format may be an IP packet, for example, an IPv4 or IPv6 packet.

The given communications protocol may be ISO 11898-1 (or "CAN 2.0"). The given communications protocol may be controller area network flexible data rate protocol (CAN-FD) protocol. The given communications protocol may be FlexRay protocol. The given communications protocol may be IEEE 802.3 (i.e. Ethernet). The given communications protocol may be media oriented systems transport (MOST) protocol. The given communications protocol may be Ethernet based. The given communications protocol may be EtherCAT, CC-Link IE Field, PROFINET, EtherNet/IP, Modbus TCP or FL-net.

According to a third aspect of the present invention there is provided a network interface module which is hardware-implemented and which comprises a protocol engine and a message handler and which is configured to exchange data packages formatted according to a given communications protocol with the protocol engine.

According to a fourth aspect of the present invention there is provided a central processing unit sub-system comprising a central processing unit, memory and a computer program stored in memory or other storage which, when executed by the central processing unit, causes the central processing unit to execute a message handler.

According to a fifth aspect of the present invention there is provided a message forwarder configured to exchange packages having a predetermined data format with first and second message handlers for handling messages according to first and second respective communications protocols. The message forwarder may be a layer-2 switch and/or layer-3 router.

According to a sixth aspect of the present invention there is provided a control unit comprising a first message handler or network interface module configured to handle data packages formatted according to a first communications protocol, a second message handler or network interface module configured to handle data packages formatted according to a second communications protocol and a message forwarder configured to exchange packages having the predetermined data format between the first and second message handlers. The message forwarder may be a layer-2 switch or layer 3-router.

The first and second communication protocols may be different. The first and second communication protocols may be the same.

The control unit may further comprise a third message configured to handle data packages formatted according to a third communications protocol (which may be the same or different to the first communications protocol and/or the second communications protocol).

The control unit may further comprise a central processing unit system wherein the message forwarder is configured to exchange between the central processing unit sub-system and the first and/or second message handlers.

The control unit may be an integrated circuit, such as a microcontroller or a system-on-a-chip.

According to a seventh aspect of the present invention there is provided a communications system comprising at least two sets of buses lines and at least one control unit according to the second aspect of the present invention which is (are) connected to the buses. The buses may include buses of different types (such as CAN, CAN-FD and Ethernet).

According to an eighth aspect of the present invention there is provided a vehicle comprising a communications system.

The vehicle may be a motor vehicle. The motor vehicle may be a motorcycle, an automobile (sometimes referred to as a "car"), a minibus, a bus, a truck or lorry. The motor vehicle may be powered by an internal combustion engine and/or one or more electric motors. The vehicle may be a train or a part of a train, such as a locomotive, railway car or multiple unit.

The vehicle may be an aircraft. The communication system may be an Avionics Full-Duplex Switched Ethernet (AFDX) system.

According to a ninth aspect of the present invention there is provided industrial system, such as plant or machinery, comprising a communications system. The plant or machinery may comprise an industrial system for use in manufacturing or processing.

According to a tenth aspect of the present invention there is provided a medical system comprising a communications system.

BRIEF DESCRIPTION OF THE DRAWINGS

Certain embodiments of the present invention will now be described, by way of example, with reference to FIGS. 2 to 8 of the accompanying drawings, in which:

FIG. 7 illustrates an AVTP common message;

FIG. 8 is a schematic diagram of a vehicular communications network and a vehicle; and FIG. 9 is a schematic diagram of an industrial communications network and robots.

DETAILED DESCRIPTION OF CERTAIN EMBODIMENTS

Communications System 1

Figure 1:
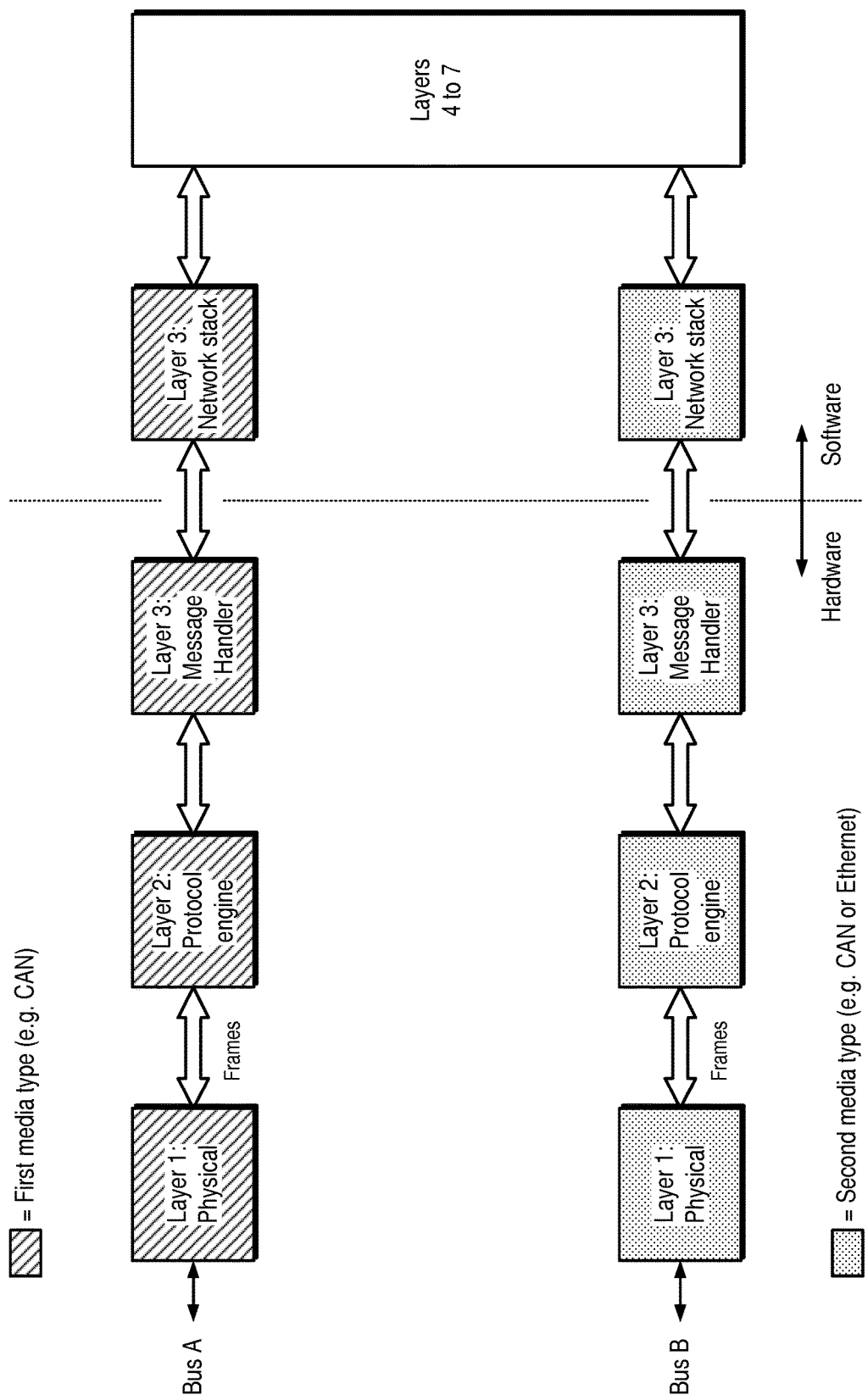
FIG. 1 is a schematic block diagram of a communications system in which data can be exchanged between buses in software.
Figure 2:
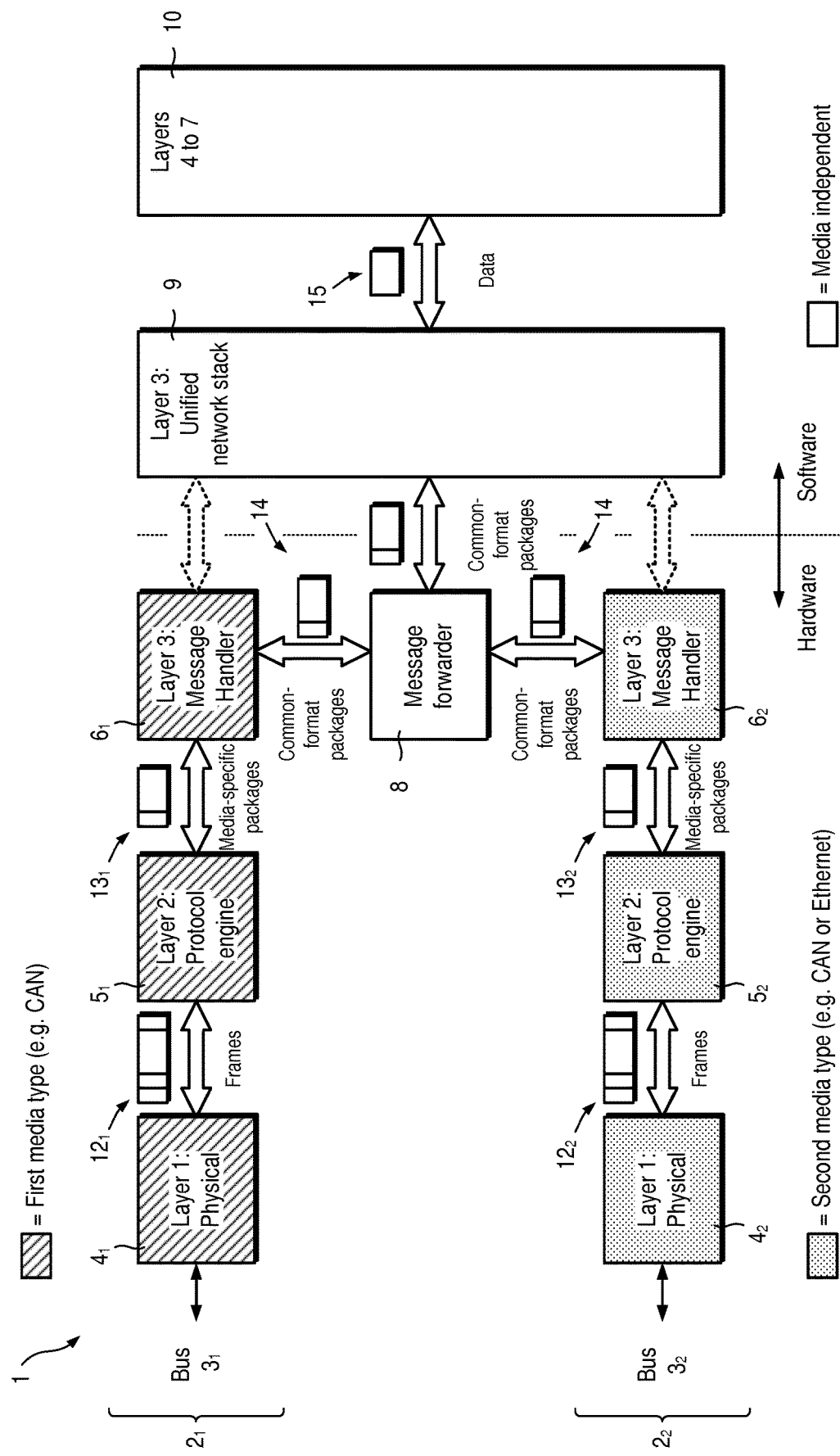
FIG. 2 is a schematic block diagram of a communications system in which data can be exchanged between buses in hardware.

FIG. 2 shows a communications system 1 which includes first and second sections $2_1$, $2_2$ for implementing the lowest protocol layers for first and second communications protocols, such as controller area network (CAN) and Ethernet, which are connected to first and second sets of bus lines $3_1$, $3_2$.

Figure 3:
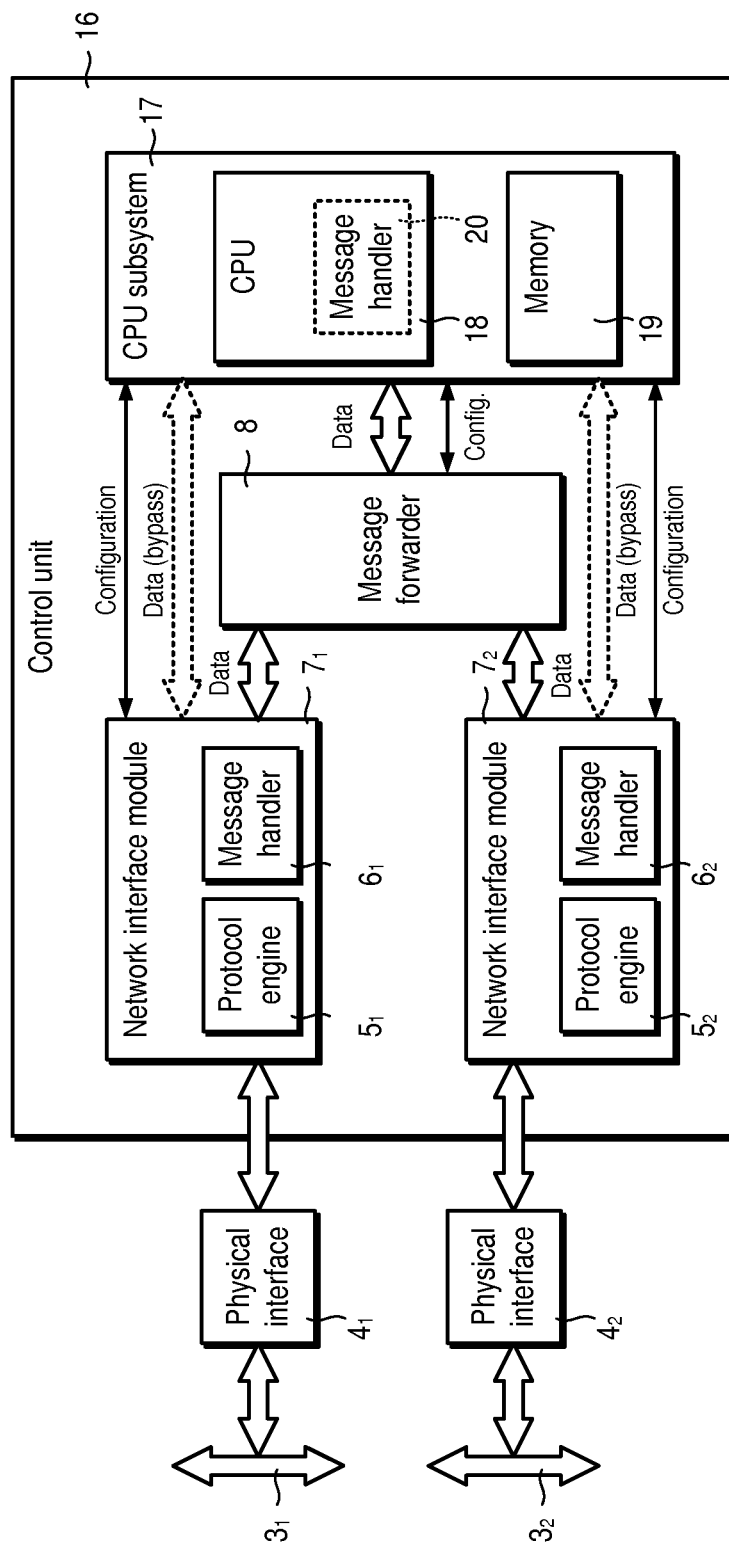
FIG. 3 is a schematic block diagram of a control unit.

The first section $2_1$ includes a physical layer module $4_1$, a protocol engine module $5_1$ and a message handler $6_1$. The protocol engine module $5_1$ and message handler $6_1$ are implemented in hardware in a network interface module $7_1$ (FIG. 3).

The second section $2_2$ includes a physical layer module $4_2$, a protocol engine module $5_2$ and a message handler $6_2$. The protocol engine module $5_2$ and message handler $6_2$ are implemented in hardware in a network interface module $7_2$ (FIG. 3).

The message handlers $6_1$, $6_2$ are interconnected by a package or message forwarder 8 which can take the form of a layer-2 switch or a layer-3 router. The message forwarder 8 is preferably implemented in hardware comprising appropriate hardware logic, hardware registers etc. The message forwarder 8 does not carry out any protocol conversion. The message forwarder 8 is also connected, via a unified network stack 9, to higher layers 10. The unified network stack 9 and higher layers 10 are implemented in software.

The physical layer module $4_1$, $4_2$ passes incoming frames $12_1$, $12_2$ to the protocol engine $5_1$, $5_2$ which can remove frame components, such as the frame check sequence (FCS), and generates packages $13_1$, $13_2$. The protocol engine $5_1$, $5_2$ may add information, such as a timestamp, to the packages $13_1$, $13_2$.

The protocol engine $5_1$, $5_2$ passes the packages $13_1$, $13_2$ to the message handler $6_1$, $6_2$ which generates common-format packages 14. As will be explained in more detail later, the message handler $6_1$, $6_2$ can pass the common-format packages 14 to the message forwarder 8 for switching or routing the common-format packages 14 to another message handler $6_1$, $6_2$ and/or to the unified network stack 9. Thus, packages can be forwarded not only between message handlers $6_1$, $6_2$, but also to higher layers 10.

If there are more than two message handlers $6_1$, $6_2$, then the message forwarder 8 can switch or route packages to more than one message handler $6_1$, $6_2$, as well as to the higher layers 10, if necessary. The message forwarder 8 may unicast or multicast messages.

Referring also to FIG. 3, the physical layer modules $4_1$, $4_2$ take the form of PHY transceivers $4_1$, $4_2$. The protocol layers $5_1$, $5_2$, message handlers $6_1$, $6_2$, message forwarder 8, unified stack 9 and higher layers 10 are implemented in a control unit 16 in the form of a microcontroller or system-on-a-chip. The control unit 16 comprises network interface modules $7_1$, $7_2$ (or "communication controllers") which provide the protocol engines $5_1$, $5_2$ and message handlers $6_1$, $6_2$. The control unit 16 comprises a central processing unit subsystem 17 which includes at least one central processing unit (CPU) 18, memory 19 and an on-chip interconnect (not shown). The physical layer modules $4_1$, $4_2$ can also be implemented in the microcontroller or system-on-a-chip.

The CPU 18 is able to configure the network interface modules $7_1$, $7_2$ and the message forwarder 8. The CPU 18 may also be able to access message handler $6_1$, $6_2$, bypassing the message forwarder 8, so as to be able to read, write and process frames more directly. Thus, the message forwarding mechanism need not be used for all frames. For example, message forwarding can be used to route frames automatically for certain, predetermined types of frames. Notwithstanding the fact that the message forwarder 8 can be bypassed, the CPU 18 may still use the common format, although it may also be able to handle data in a specific media format, such as CAN.

The CPU 18 may run a software-based message handler 20. This can allow the CPU 18 to prepare common-format messages 14 which can then be sent either directly, or via the message router 8, to one or more message handlers $6_1$, $6_2$.

Message Handlers $6_1$, $6_2$

As mentioned earlier, a message handler $6_1$, $6_2$ receives data packages $13_1$, $13_2$ from a respective protocol engine $5_1$, $5_2$, such as a CAN protocol engine, and generates common-format packages 14.

Figure 4:
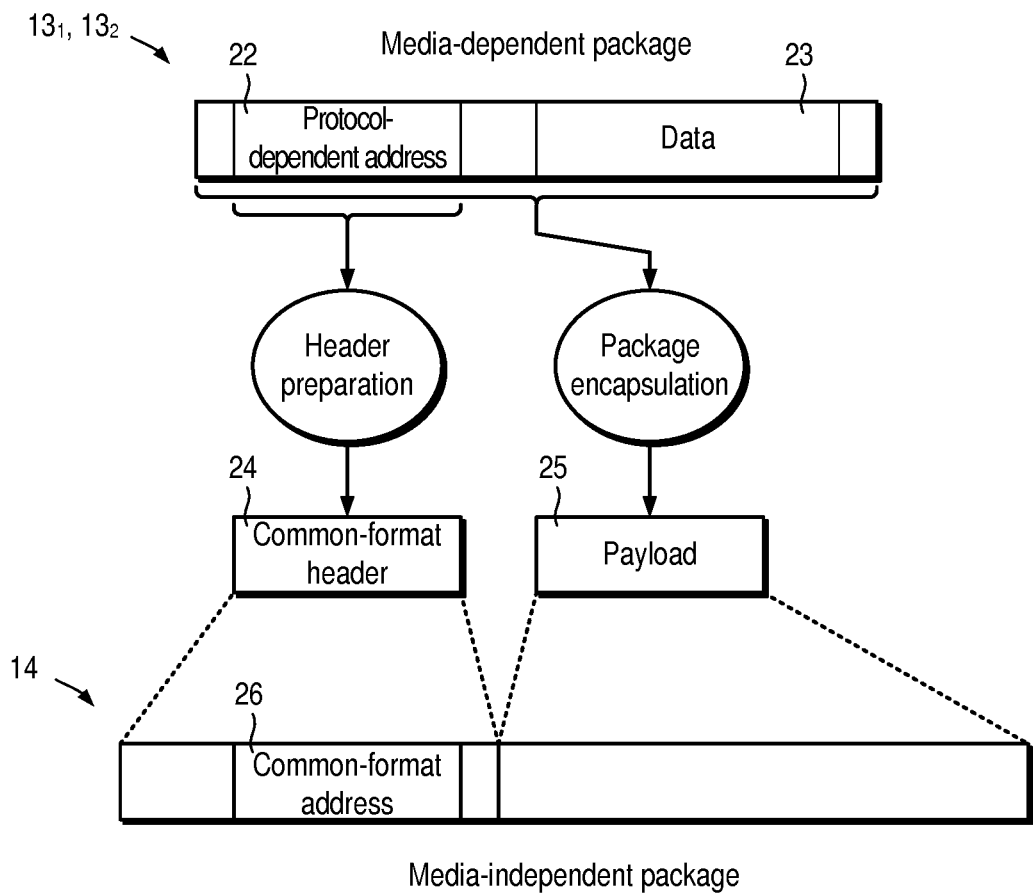
FIG. 4 illustrates conversion of a communications protocol-dependent package into a common-format package.

Referring also to FIG. 4, each data package $13_1$, $13_2$ includes a protocol-dependent address 22 and payload 23.

The format of the address 22 and how the address 22 is used depends on the communications protocols. For example, Ethernet uses 48-bit media access control (MAC) addresses to identify destination nodes for unicasting or multicasting packets. CAN uses 11- or 29-bit message identifiers to identify message content for multicasting messages. FlexRay uses a temporary relation to identify message content for multicasting messages.

Priority control can be included in the address, in the payload 23 or signalled in other ways. For example, in Ethernet, priority information is included in the payload, whereas in CAN, message priority is included in the message identity. In FlexRay, message priority is based on repetition in pre-defined cycles.

The message handler $6_1$, $6_2$ extracts the protocol-dependent address 22 from a data package $13_1$, $13_2$ and prepares a common-format header 24 and payload 25. The common-format header 24 includes a common-format address 26.

The message handler $6_1$, $6_2$ maps the protocol-dependent address 22 into a common-format address 26. Preferably, address and message identification are split into different fields. This can help to simplify routing of the common-format package 14.

The message handler $6_1$, $6_2$ encapsulates the data package $13_1$, $13_2$ received from the protocol engine $5_1$, $5_2$ into the payload 25 of the common-format message 14. Thus, the common-format message 14 can carry information for all supported data link layers, such as CAN message ID as well as a common-format address. If the common-format message 14 uses a layer-2 or layer-3 protocol which does not allow tunnelling of all fields (such as baud rate bit of CAN) such that it results in missing information, then the message handler $6_1$, $6_2$ may be configured to fill-in the missing information, for example, configured by software running on the CPU 18.

Figure 5:
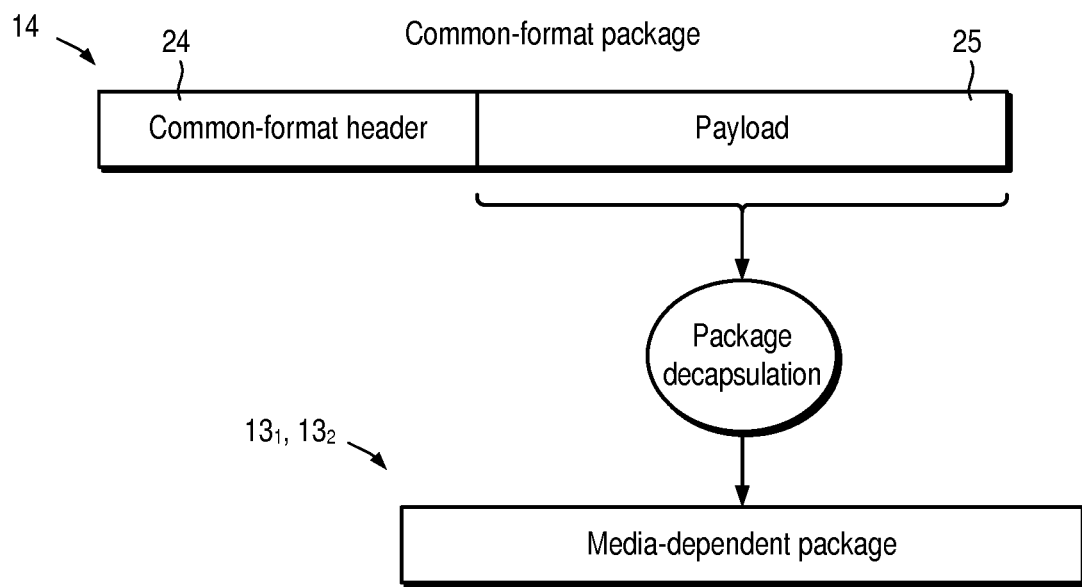
FIG. 5 illustrates conversion of a common-format package into a communications protocol-dependent package.

Referring also to FIG. 5, when a message handler $6_1$, $6_2$ receives a common-format package 14 from the message forwarder 10, it discards the header 26 and extracts the data package $13_1$, $13_2$ from the payload 25. The message handler $7_1$, $7_2$ then forwards the package $13_1$, $13_2$ to the protocol engine $5_1$, $5_2$.

As explained earlier, the message forwarder 8 may forward a common-format package 14 to more than one target.

The one or more targets may include more than one message handler $6_1$, $6_2$. The one or more targets may include the CPU 18.

The common-format package 14 provides a common addressing format which allow identification of a target node (not shown) outside the control unit 16 (FIG. 3) or a target service (not shown) running on the CPU 18. The common addressing format preferably also provides a quality of service (QoS) level. The common addressing format provides a minimum set of information which allows switching or routing to be performed.

The common-format package 14 provides a container which allows a communication protocol, such as Ethernet, CAN or FlexRay, to map its message back into its protocol-specific message format.

The common-format package 14 can be any suitable type of layer-2 or layer-3 data container. Preferably, the common-format package 14 take the form of Audio Video Transport Protocol (AVTP) Control Format (ACF) messages defined according to IEEE 1722 using the 64-bit stream ID as the common-format address 26 and 8-level QoS according to IEEE 802.1Q for signalling priority levels. This allows a layer-2 Ethernet switch to be used a message forwarder 8.

ACF messages using stream ID as the common-format address need not be used. Other types of data container can be used, such as a layer-3 datagram (i.e. an "IP packet" or simply "packet") using the IP address as the common-format address (e.g. based on IPv4 or IPv6) or a layer-2 datagram (i.e. "frame") which uses the MAC address as the common-format address.

Figure 6:
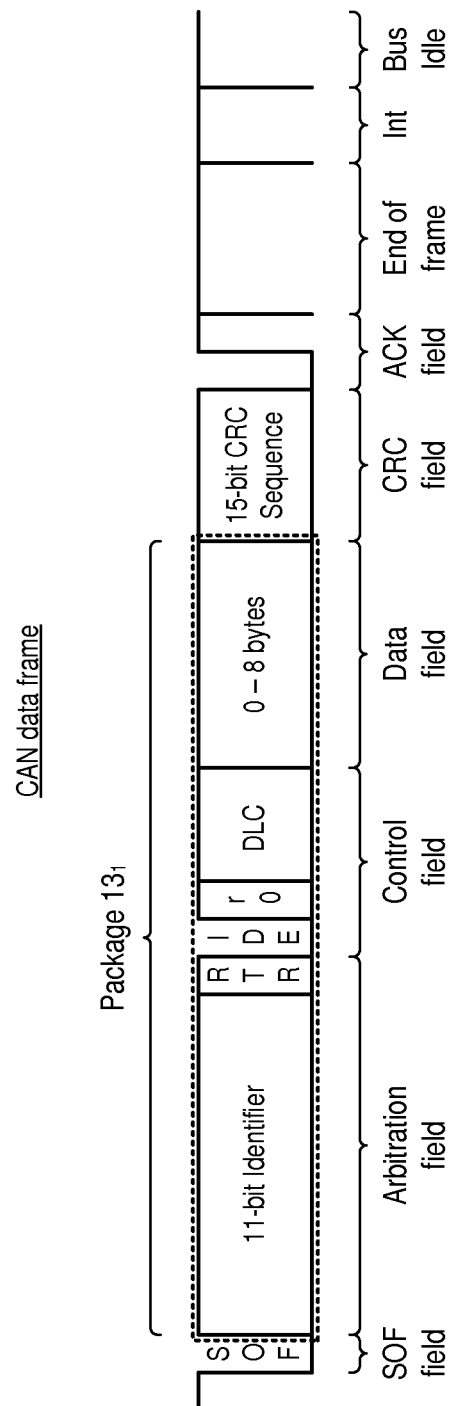
FIG. 6 illustrates a CAN frame including a CAN-dependent package.

FIG. 6 shows a data package $13_1$, taken from a CAN data frame, which is passed from the protocol engine $5_1$ to the message handler $6_1$.

FIG. 7 shows how the data package $13_1$ shown in FIG. 6 is converted into a common-format package 14.

As shown in FIG. 6, data in some of the fields, such as RTR, IDE and DATA (i.e. payload data), are obtained by copying data from the data package $13_1$. Data are added to other fields according to pre-defined schemes which may be based on acceptance filter lists (AFLs) or look-up tables. Data are added to other fields dependent on data found in fields in the data package $13_1$. Although the message handler $6_1$ is implemented in hardware, it can be configured by the CPU 18.

The IEEE 802.1 and 802.1Q headers are not required, but are helpful because IEEE 1722 messages are typically encapsulated in Ethernet packages.

Referring to FIG. 8, a vehicular communications network 31 is shown. The network 31 includes a plurality of different busses $3_1$, $3_2$, $3_3$, such as CAN and Ethernet. The network includes a plurality of control units 32 which may take the form of microcontrollers connected to the busses $3_1$, $3_2$, $3_3$. At least some of the control units 32 are control units 16 which include network interface modules $7_1$, $7_2$ (FIG. 3) and message forwarder 8. The vehicular communications network 31 is deployed in a vehicle 33.

Referring to FIG. 9, an industrial communications network 41 is shown. The network 41 includes a plurality of different busses $3_1$, $3_2$, $3_3$, such as CAN and Ethernet. The network includes a plurality of control units 42 which may take the form of microcontrollers connected to the busses $3_1$, $3_2$, $3_3$. At least some of the control units 42 are control units 16 which include network interface modules $7_1$, $7_2$ (FIG. 3) and message forwarder 8. The industrial communications network 41 is deployed in a plant, machinery or system 43, such as a manufacturing or processing system.

The message handlers $6_1$, $6_2$ can have one or more benefits.

The message handlers $6_1$, $6_2$ can help to provide uniformity in the way messages are forwarded regardless of bus type and whether the message arrived on a communications bus or is generated by the CPU. It can also provide configurable flexibility, for example, allowing messages to be forwarded to multiple targets. Furthermore, the use of a common network stack reduces the degree of layer-3 software stack adaption when adding a new protocol. Moreover, a common set of functions are available, regardless of protocol, such as an abstract QoS mechanism (for example, mapped to IDs on CAN, to 802.1Q PCP on Ethernet and to scheduling on FlexRay), an abstract node addressing mechanism (for example mapped to IDs on CAN, to MAC, VLAN, AVTP or IPv4 on Ethernet) and a unified timestamping mechanism (for example, based on 802.1AS). Additionally, it can simplify software maintenance when changing protocol (for example, porting a CAN-based control unit to Ethernet).

Modifications

It will be appreciated that many modifications may be made to the embodiments hereinbefore described.

The control units may include more than two network interface modules. Two or more of the network interface modules may be of the same type, for example, CAN controllers. Thus, the control unit may be connected to more than two types of bus. The message forwarder may be connected to more than two network interface modules. Thus, the control unit may be connected to more than two buses of the same type. The message forwarder may be connected to more than two network interface modules. Thus, the message forwarder may switch or route common-format messages between three or more message handlers.

The invention claimed is:

1. A hardware-implemented network interface module comprising:
    a protocol engine; and
    message handler which is configured, in response to receiving a data package which is formatted according to a given communications protocol and which comprises package-directing data and payload data, to generate a package having a predetermined data format which comprises a header and payload, wherein the header comprises an address generated in dependence upon the package-directing data and wherein the payload comprises the data package;
    wherein the data package which is formatted according to the given communications protocol is received from the protocol engine or from a unified network stack.

2. A hardware-implemented network interface module according to claim 1, wherein the package having the predetermined data format is a layer-2 or layer-3 package.

3. A hardware-implemented network interface module according to claim 1, wherein the message handler is configured to carry out one or more operations selected from:
    copying data from a first field in the package-directing data into a corresponding field in the header;
    adding predetermined data to a second field in the header; and
    adding calculated data to the header in dependence upon data from a first field in the package-directing data and/or from a second field in the package-directing data to the second field in the header.

4. A hardware-implemented network interface module according to claim 1, wherein the message handler is configured, in response to receiving a package having a predetermined data format which comprises a header and payload data, to extract a data package which is formatted according to a given communications protocol and which comprises package-directing data and payload data.

5. A hardware-implemented network interface module according to claim 1, wherein the package having the predetermined data format is a layer 2 frame.

6. A hardware-implemented network interface module according to claim 1, wherein the package having the predetermined data format is an IP packet.

7. A hardware-implemented network interface module according to claim 1, wherein the given communications protocol is the FlexRay protocol.

8. A hardware-implemented network interface module according to claim 1, wherein the given communications protocol is the media oriented systems transport protocol.

9. A hardware-implemented network interface module according to claim 1, wherein the package having the predetermined data format is readable by a UDP gateway.

10. A message handler according to claim 1, wherein the given communications protocol is ISO 11898.

11. A hardware-implemented network interface module comprising:
 a protocol engine and;
 a message handler configured, in response to receiving a package having a predetermined data format which comprises a header and payload, to extract a data package which is formatted according to a given communications protocol and which comprises package-directing data and payload data, and to forward the data package to the protocol engine or to a unified network stack.

12. A control unit comprising:
 the hardware-implemented network interface module according to claim 1, the hardware implemented network interface module being a first hardware implemented network interface module and the message handler being a first message handler configured to handle data packages formatted according to a first communications protocol;
 a second hardware-implemented network interface module comprising a second message handler configured to handle data packages formatted according to a second communications protocol; and
 a message forwarder configured to exchange packages having the predetermined data format between the first and second message handlers.

13. A control unit according to claim 12, wherein the message forwarder is a layer-2 switch and/or a layer 3-router.

14. A control unit according to claim 12, wherein the first and second communication protocols are different.

15. A control unit according to claim 12, further comprising:
 a third hardware-implemented network interface module comprising a third message handler configured to handle data packages formatted according to a third communications protocol.

16. A control unit according to claim 12, further comprising a central processing unit sub-system;
 wherein the message forwarder is configured to exchange between the central processing unit sub-system and the first and/or second message handlers.

17. A communications system comprising:
 at least two sets of buses lines; and
 at least one control unit according to claim 12 connected to the buses.

18. A control unit according to claim 12, wherein the message forwarder is configured to exchange packages with an Ethernet message gateway.

19. A control unit according to claim 12, further comprising:
 a central processing unit sub-system; and
 wherein the central processing unit sub-system is configured to permit direct access to the first message handler and the second message handler, bypassing the message forwarder.

* * * * *